United States Patent Office 2,854,699
Patented Oct. 7, 1958

2,854,699

COMPRESSION MOLDING OF COPOLYMERS OF TRIFLUOROCHLOROETHYLENE AND VINYLIDENE FLUORIDE

Lester E. Robb, Westfield, N. J., assignor, by mesne assignments, to Minnesota Mining and Manufacturing Company, St. Paul, Minn., a corporation of Delaware No Drawing. Application April 19, 1955
Serial No. 502,509

7 Claims. (Cl. 18—55)

This invention relates to, and has as an object, the compression molding of copolymers of trifluorochloroethylene and vinylidene fluoride. In one aspect, the invention relates to, and has as an object, the compression molding of elastomeric copolymers of trifluorochloroethylene and vinylidene fluoride. More particularly in this aspect, the invention relates to, and has as an object, the compression molding of elastomeric copolymers of trifluorochloroethylene and vinylidene fluoride for the purpose of forming useful articles of this material.

Elastomeric copolymers of trifluorochloroethylene and vinylidene fluoride are found to possess a wide variety of commercial applications and utility. These elastomeric copolymers possess, in addition to good flexibility, resilience and elasticity, high tensile strength, hardness, and good resistance to heat. They exhibit good elastomeric properties and flexibility even when subjected to relatively low temperatures. These copolymers exhibit corrosion-resistance to oils, hydrocarbon fuels, and various powerful reagents. In this respect, the copolymers are unaffected even after prolonged exposure to hydrofluoric acid, hydrochloric acid, and strong caustic solutions, as well as concentrated sulfuric acid, fuming nitric acid, aqua regia, and other vigorous oxidizing materials. The copolymer is not affected by water or by humidity, and in general is a highly efficient insulating material. In one of its preferred commercial applications, it is desirable to compression mold this copolymer in the form of sheets, O rings, shaft seals, button seals, unsupported and reinforced diaphragms, grommets, gaskets, ribbons, bands, and various other forms, in which insulation is required in the form of a material which exhibits good elastomeric properties, together with high chemical and physical stability.

The elastomeric copolymers of trifluorochloroethylene and vinylidene fluoride, molded in accordance with this invention, contain between about 20 mole percent and about 69 mole percent of trifluorochloroethylene, and the remaining major constituent being vinylidene fluoride. In general, these copolymers are prepared by copolymerizing the trifluorochloroethylene monomer with the vinylidene fluoride monomer at temperatures between about —25° C. and about 50° C. in the presence of a polymerization catalyst, either as an inorganic promoter in the form of a water-suspension type recipe or as an organic peroxide promoter in mass or bulk-type polymerization. When the polymerization promoter is in the form of a water-suspension type recipe, the reaction is preferably carried out at a temperature between about 0° C. and about 35° C. When the polymerization promoter is an organic peroxide promoter in a mass polymerization system, the reaction is preferably carried out at a temperature between about —20° C. and about 0° C. Of the water-suspension recipe type catalysts, a redox catalyst system is preferred (having no emulsifier), and contains an oxidant, a reductant and a variable valence metal salt. The oxidant in the water-suspension type recipe is preferably an inorganic persulfate such as potassium persulfate, sodium persulfate or ammonium persulfate, the former being most desirable. The reductant is preferably a bisulfite, such as sodium bisulfite or potassium bisulfite, and preferably the former. The variable valence metal salt, which is employed for the purpose of regenerating the oxidant, is preferably in the form of an iron salt, such as ferrous sulfate or ferrous nitrate, with ferrous sulfate being the most desirable variable valence metal salt. Of the organic peroxide promoters, halogen-substituted acetyl peroxides are employed in carrying out the copolymerization reaction in the absence of a suspension agent. Trichloroacetyl peroxide is a preferred promoter of this type. Other halogen-substituted organic peroxides suitable for carrying out the copolymerization reaction are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

As indicated above, the finished elastomeric copolymers of trifluorochloroethylene and vinylidene fluoride contain between about 20 mole percent and about 69 mole percent trifluorochloroethylene, with the remaining major constituent being vinylidene fluoride. If the finished elastomeric copolymer contains less than about 20 mole percent of the trifluorochloroethylene monomer, the copolymer exhibits a tendency to lose the desirable properties of corrosion-resistance to strong oxidants and other powerful reagents, due to the high increase in the vinylidene fluoride content. If on the other hand, the finished copolymer contains more than about 69 mole percent of the trifluorochloroethylene monomer, the copolymer exhibits stiffness and reduced flexibility and thus loses its desirable elastomeric properties. Within this critical range, it is preferred that the finished elastomeric copolymers contain between about 25 mole percent and about 50 mole percent of the trifluorochloroethylene monomer, with the vinylidene fluoride monomer constituting the remaining major constituent.

In order to produce the aforementioned elastomeric copolymers of trifluorochloroethylene and vinylidene fluoride, a proper feed must be selected for the preparation of a finished copolymer of desired composition, having between about 20 mole percent and about 69 mole percent of trifluorochloroethylene, with the remaining major constituent being vinylidene fluoride. For this purpose, monomer reactivity ratios for trifluorochloroethylene and vinylidene fluoride are calculated in accordance with the Mayo, Lewis and Walling Equation,* which, together with specific operating conditions for carrying out the polymerization to produce the above-mentioned finished elastomeric copolymers of trifluorochloroethylene and vinylidene fluoride, are fully described in application S. N. 332,218, filed January 21, 1953, in the name of Albert L. Dittman, Herbert J. Passino, and Wilber O. Teeters, now Patent No. 2,752,331 and is therefore believed to require no further elaboration insofar as the purposes of this invention are concerned. In general, however, it is found that the feed composition will comprise between about 5 mole percent and about 75 mole percent of trifluoro-

*"Copolymerization," F. R. Mayo and Cheves Walling, Chemical Reviews, vol. 46, pages 195–197.

chloroethylene with the remainder of the copolymer feed being made up of vinylidene fluoride, to produce an elastomeric copolymer comprising between about 20 mole percent and about 69 mole percent of trifluorochloroethylene. To produce an elastomeric copolymer within the preferred range, in which the trifluorochloroethylene is present in an amount between about 25 mole percent and about 50 mole percent, the feed composition will comprise between about 7 mole percent and about 40 mole percent of trifluorochloroethylene, with the remaining major constituent being vinylidene fluoride.

The aforementioned elastomeric copolymers of trifluorochloroethylene and vinylidene fluoride, with which the process of the present invention is concerned, are obtained from the polymerization reactor or bomb in the form of chunks of rubbery polymer in admixture with water. These chunks are separated from the water; and then are next separately washed with hot water to remove residual salts, followed by drying in vacuo at a temperature between about 20° C. and about 35° C. The finished elastomeric copolymer is thus obtained as a white spongy crumb or gum.

The aforementioned crumb of the elastomeric copolymer of trifluorochloroethylene and vinylidene fluoride has been found, through X-ray analysis, to be amorphous at temperatures as low as −40° C. Upon being subjected to stretching up to 300%, typical fiber diagrams are observed indicating susceptibility to orientation and crystal formation. The high thermal stability of the elastomeric copolymer, is apparent from the fact that there is no evidence of chain scission or halogen loss after prolonged exposure at 400° F. The specific gravity of this elastomeric gum is approximately 1.85. It is readily soluble in ketones, esters, and cyclic ethers; but insoluble in alcohols, and aliphatic, aromatic and chlorinated hydrocarbons. The uncured elastomer is found to have a durometer hardness of 45A–50A, and possesses an excellent storage life. Samples, exposed to strong ultraviolet light for 100 hours and stored at room temperature for more than a year, have exhibited no apparent change in properties. In carrying out the compression molding of the aforementioned elastomeric copolymers of trifluorochloroethylene and vinylidene fluoride, in accordance with the process of the present invention, specific operating conditions and handling technique are necessitated to produce finished compressed articles possessing the aforementioned desired properties.

In accordance with the process of the present invention, the elastomeric copolymer of trifluorochloroethylene and vinylidene fluoride is subjected to the compression molding cycle starting with either an unvulcanized raw rubbery crumb or gum, or starting with this raw rubbery material having employed therein suitable vulcanizing agents, as more fully hereinafter discussed. The compression molding of this material, however, cannot be carried out when starting with the copolymeric material already in a vulcanized state. In those instances in which it is desired to produce a finished vulcanized elastomeric copolymer of trifluorochloroethylene and vinylidine fluoride, suitable vulcanizing agents are impregnated in the raw rubbery crumb, employing a conventional two-roll mill, maintained at a temperature between about 125° F. and about 170° F. to produce a compounded uncured stock comprising a coherent high-density sheet of gum. This high-density sheet is preferably approximately 10 percent thicker than the ultimate desired thickness of the finished compression molded article. The sheet is then cut into the desired dimensions or shapes suitable for introduction into the die cavity of the compression molding apparatus.

In carrying out the compression molding cycle of the above-mentioned elastomeric copolymeric material of trifluorochloroethylene and vinylidene fluoride, employing either an unvulcanized raw rubbery crumb, or a compounded uncured stock which contains the vulcanizing agent, as indicated above, recognition of the transition temperature of this material must be taken into consideration in order to accomplish proper compression molding thereof into the various forms of articles that can be fabricated by this type of molding. This elastomeric copolymer is found to have a transition temperature varying between about 170° F. and about 190° F. The transition is characterized by a change taking place in which the copolymeric material passes from an elastic to an inelastic or powdery state.

The aforementioned transition temperature of the elastomeric copolymer can best be described as being in the nature of a physical transition temperature range, as distinguished from any physical-chemical property. The elastomeric copolymer, when undergoing a shearing stress within the aforementioned transition temperature range, changes physical form at the interface where the shearing stress is at a maximum. This change from the aforementioned elastic to an inelastic or powdery state, occurs at the surface of the compression molded copolymer, when temperatures are maintained within the aforementioned transition temperature range. The same phenomena are observed in milling operations when both shear-stress and the aforementioned transition temperatures, are present. The above changes in the condition of the elastomeric material are of a reversible nature. The powdery material can be banded on the mill at lower temperatures (e. g., 100–120° F.) to produce an elastic or rubbery gum sheet. On the other hand, a piece of rubbery gum resting in the oven within the aforementioned transition temperature range (170–190°F.), i. e., in the absence of applied stress, will not show such change. The aforementioned transition temperature range of the elastomeric copolymers of the present invention, in being described as a physical transition temperature range, will serve to distinguish this phenomenon from elastomeric materials having first and second order transition temperatures which are true thermodynamic values.

In view of this change taking place during the processing of the copolymeric material within this temperature range, it will, therefore, be apparent why it is important, if any vulcanizing agents are to be added to the raw copolymeric material, that the vulcanizing agents should, preferably, be impregnated into the raw rubbery crumb at the aforementioned temperature between about 125° F. and about 170° F. In view of the nature of the transition temperature of this material during any heating operation, proper conditions must be maintained within the die of the compression molding apparatus employed in carrying out the molding cycle.

The compression molding of the elastomeric copolymers of the present invention is carried out by placing the raw rubbery polymer, with or without a vulcanizing agent being present therein, in a die which is maintained at a temperature above the aforementioned transition temperature (viz., 170–190° F.) and not higher than about 300° F. Within this range, temperatures between about 225° F. and about 275° F. are preferred. The compacting pressure which is imposed upon the elastomeric material within the die may vary between about 200 to about 3,000 pounds per square inch. Within this range, pressures between about 1,500 and about 2,500 pounds per square inch are preferred. The aforementioned temperature and pressure conditions are maintained upon the elastomeric material within the die for a time sufficient to permit the material to assume the internal contour of the die and to attain the size and shape of the desired article. In general, the molding cycle should be carried out under the desired temperature and pressure conditions for a period of at least five minutes. In instances in which a curing or vulcanizing agent is present in the copolymeric material, it is preferred that the desired temperature and pressure conditions be maintained for a period of at least ten minutes. After the molding cycle is complete, the die is subsequently cooled and the formed article may then be removed. It is also possible, in this respect, to release the pressure upon the die, remove the heated article and subject it to water cooling, outside the die, if so desired.

It should be noted that although, as indicated above, a temperature above the transition temperature (viz., between about 170° F. and about 190° F.) results in the copolymeric material passing from an elastic to a powdery state; nevertheless, the temperature within the die may be raised to any temperature which is below the temperature of substantial decomposition of the material itself. This temperature is approximately 450° F. Normally, however, it is not desirable to employ temperatures appreciably above the uppermost limit of the aforementioned molding temperature range (viz., above about 275° F.–300° F.) If the temperature within the molding die is maintained above approximately 300° F., and below the temperature of substantial decomposition (i. e., approximately 450° F.), although such temperature is sufficiently high to permit free-flow of the copolymeric material into and around the die cavity; nevertheless, such elevated temperature is also high enough to initiate vulcanization if a curing agent is present. This vulcanization at such elevated temperature causes an excessive rate of cross-linking to take place before the material fills the die cavity and results in an imperfectly formed article. If, on the other hand, the molding operation is conducted at the aforementioned elevated temperatures above 300° F. without a vulcanizing agent being present, discolorization is found to exist in the molded article. With regard to the aforementioned cooling of the molded elastomeric material, either within the die cavity itself, or upon removal of the molded article from the die cavity and subsequent immersion in water to undergo cooling, it should be noted that such cooling is not in the nature of a quenching operation (as may be applicable to treatment of various other forms of molded elastomeric materials), since during such cooling treatment the heated compression molded article does not pass from an amorphous to a crystalline state.

As previously indicated, the compression molding of the elastomeric copolymers of this invention, is preferably carried out with a compounded uncured stock, containing suitable vulcanizing agents impregnated in the raw rubbery crumb. The compounding of this elastomeric material, as previously indicated, employing a conventional two-roll mill, is carried out by banding the raw rubbery crumb or gum on the rolls which are heated to the aforementioned temperature, viz., between about 125° F. and about 170° F. Once the rubbery material has banded, the heat of milling is sufficient to maintain the bands, and the rolls are then cooled so that scorching is avoided as the vulcanizing or curing agents are added. Unlike unsaturated hydrocarbon rubbers, this elastomeric material does not shown any appreciable breakdown during the milling operation.

When starting with a compounded stock containing suitable vulcanizing agents, the vulcanization treatment itself, is initiated and partially completed within the compression molding die. Final vulcanization is carried out outside the molding apparatus (after the compression molding cycle has been completed), in suitable apparatus such as an oven or in an autoclave under steam pressure at temperatures between about 185° F. and about 300° F., depending upon the vulcanizing agents employed. Inasmuch as this elastomeric copolymer is a fully saturated fluorocarbon, it is not readily vulcanized by normal rubber curatives. However, this copolymer can be vulcanized employing organic peroxides, polyisocyanates, polyamines, and isocyanate-amine combinations. The marked increase in the strength and solvent resistance of the finished molded elastomeric copolymer, after vulcanization has taken place, is found to indicate that the elastomer has undergone a chemical change, producing a network or cross-linked type of structures. In Table I are shown the properties of the uncured elastomeric gum. In Table II is shown a comparison of finished, vulcanized elastomeric copolymers of the present invention when employing various curing systems.

TABLE I

*Properties of uncured elastomer gum*

| | |
|---|---|
| Specific gravity | 1.85. |
| Fluorine content | >50%. |
| Color | Translucent off-white. |
| Tensile, p. s. i | 300–600. |
| Elongation, percent | 600–800. |
| Shore A hardness | 40–45. |
| Intrinsic viscosity, (methyl ethyl ketone 30° C.) | 2–3. |
| Solubility | Ketones, esters, ethers. |
| Storage | >two years (unchanged). |

TABLE II

*Comparison of curing systems for elastomers*

| Curative Type Stock | Peroxide | Amine | MDI | MDI | Amine |
|---|---|---|---|---|---|
| Compound: | | | | | |
| Elastomer | 100 | 100 | 100 | 100 | 100 |
| Zinc Oxide | 10 | 5 | 5 | 5 | 5 |
| Benzoyl Peroxide | 3 | | | | |
| MDI [1] | | | 5 | 5 | 5 |
| Tetraethylene Pentamine | | 6 | | | 1 |
| Trimene Base [2] | | | | 3 | |
| Press Cure: | | | | | |
| Time, hours | ½ | 1 | 1 | 1 | 1 |
| Temperature, °F | 230 | 260 | 260 | 260 | 260 |
| Oven Cure: | | | | | |
| Time, hours | 16 | 1 | 72 | 16 | 16 |
| Temperature, °F | 300 | 300 | 212 | 212 | 212 |
| Physical Properties: | | | | | |
| After Press Cure— | | | | | |
| Stress at 300% E, p. s. i | 200 | 530 | 400 | 760 | |
| Tensile Strength, p. s. i | 350 | 1,280 | 530 | 1,590 | |
| Percent Elongation | 750 | 600 | 350 | 400 | |
| Hardness, Shore A | 40 | 48 | 53 | 50 | |
| After Oven Cure— | | | | | |
| Stress at 300% E, p. s. i | 530 | 1,020 | 590 | 1,170 | 630 |
| Tensile Strength, p. s. i | 350 | 1,620 | 800 | 1,460 | 1,250 |
| Percent Elongation | 500 | 450 | 320 | 400 | 580 |
| Hardness, Shore A | 47 | 55 | 61 | 58 | 60 |
| Tear Strength, p. p. i | | | 43 | 53 | |

[1] Methylene bis (4-phenyl isocyanate).
[2] Cyclic secondary amine (Naugatuck Chemical Company).

Of the organic peroxides which have been employed to vulcanize the raw elastomeric copolymer, benzoyl peroxide has been found to be the most convenient curing agent. It is easily dispersed in the rubbery material and is found to react efficiently at the aforementioned molding temperatures. The optimum range of the benzoyl peroxide concentration is between about 1.5 to about 3.0 parts per 100 parts of raw elastomeric copolymer, by weight. Metallic oxides, such as those of zinc, calcium, lead, and lead salts, such as dibasic lead phosphite, tribasic lead maleate, and tribasic lead sulfate may be employed as stabilizers or accelerators in the benzoyl peroxide curing treatment to improve and maintain the physical properties of the vulcanizate. At the aforementioned peroxide levels the optimum concentrations of both metal oxides and lead salts are 5 to 10 parts per 100 parts of elastomeric copolymer.

Extensive experimentation with elastomeric copolymer stocks when compounded with zinc oxide, shows that these stocks possess high initial tensile strength and good aging properties at both normal and elevated temperatures. Magnesium and calcium oxides have also been found to impart high tensile strength, but tend to increase the water absorption characteristics of the elastomeric material. Lead oxide stocks are characterized by lower moduli and higher elongations. The effects of incorporating various metal oxides and lead salts in benzoyl peroxide compounds are shown in Table III,

TABLE III

*Effect of metal oxide variation and basic lead salts on peroxide cured elastomer*

| Run Number | 1 | 2 | 3 | 4 | 5 | 6 |
|---|---|---|---|---|---|---|
| Compound: | | | | | | |
| Elastomer | 100 | 100 | 100 | 100 | 100 | 100 |
| Zinc Oxide | 10 | 10 | | | 10 | 10 |
| Litharge | | | 10 | | | |
| Calcium Oxide | | | | 10 | | |
| Benzoyl Peroxide | 3 | 3 | 3 | 3 | 3 | 3 |
| Dibasic Lead Phosphite | | 10 | 10 | 10 | | |
| Tribasic Lead Phosphite | | | | | 10 | |
| Tribasic Lead Maleate | | | | | | 10 |
| Press Cure: | | | | | | |
| Time, hours | ½ | ½ | ½ | ½ | ½ | ½ |
| Temperature, °F | 230 | 230 | 230 | 230 | 230 | 230 |
| Oven Cure: | | | | | | |
| Time, hours | 16 | 16 | 16 | 16 | 16 | 16 |
| Temperature, °F | 300 | 300 | 300 | 300 | 300 | 300 |
| Physical Properties: | | | | | | |
| After Press Cure— | | | | | | |
| Stress at 300% E, p. s. i | 200 | 450 | 340 | 380 | 505 | 375 |
| Tensile Strength, p. s. i | 350 | 920 | 640 | 715 | 1,040 | 690 |
| Percent Elongation | 750 | 450 | 600 | 550 | 450 | 500 |
| Hardness, Shore A | 40 | 45 | 42 | 45 | 47 | 42 |
| After Oven Cure— | | | | | | |
| Stress at 300% E, p. s. i | 530 | 660 | 435 | 760 | 685 | 490 |
| Tensile Strength, p. s. i | 1,350 | 2,500 | 2,200 | 2,180 | 2,120 | 2,400 |
| Percent Elongation | 500 | 500 | 650 | 475 | 500 | 550 |
| Hardness, Shore A | 47 | 51 | 48 | 47 | 52 | 47 |
| Tear Strength, p. p. i | | 123 | 141 | | | |

To preclude blowing or out-gasing in molded articles having thicknesses greater than about 75 mils, it is preferred to lower the peroxide concentration to about 1.5 parts per 100 parts of elastomeric copolymer. This reduction in the quantity of peroxide employed does not appreciably change the physical properties of the stock. An example of such a compound is one containing 10 parts of zinc oxide, 10 parts of dibasic lead phosphite, and 1.5 parts of benzoyl peroxide per 100 parts of raw elastomeric gum. The peroxide stocks are smooth, pliable, soft, easily processed and flow well in the mold. These stocks, when subsequently cured, have excellent physical properties and possess maximum resistance to oxidative chemical attack.

Of the amines which have been employed to vulcanize the raw elastomeric copolymer strongly basic primary and secondary aliphatic polyamines have been found most effective. In this respect, triethylene tetramine, tetraethylene pentamine, trimene base, and hexamethylene diamine impart the highest tensile strength. The optimum amine concentrations are 1½ to 6 parts of amine per 100 parts of raw elastomeric gum. The fresh tensile strengths of amine stocks vary directly with the amine concentration; however, high amine loadings result in stocks which tend to become short after prolonged high temperature aging.

The amine stocks tend to scorch when processed on a hot two-roll mill; however, scorching can be controlled by introducing the amine in the form of an amine salt, such as hexamethylene diamine diacetate. The amine stocks are capable of being cured in a shorter period of time than other raw elastomeric stocks of the copolymers of the present invention. The recommended curing cycle is one hour in the press at about 260° F., followed by a one hour after-cure in the oven at 300° F. The primary advantage of amine stocks is that, unlike the aforementioned peroxide stocks, they can be plasticized effectively with commercial plasticizers. It has been found that these plasticized amine stocks are more resilient and have better compression set and low temperature properties than other raw elastomeric stocks of the copolymers of the present invention.

With respect to the polyisocyanates, that may be employed as vulcanizing agents incorporated in the raw elastomeric copolymers of the present invention, such compounds may be employed as methylene bis(4-phenyl isocyanate), supra, toluene 2,4-diisocyanate, and methane tri-(4-phenyl isocyanate). Metal oxides are employed to accelerate this type of cure. Concentrations of 5 to 10 parts of isocyanate and 5 to 10 parts of metal oxide per 100 parts of raw elastomeric copolymer are preferred.

The subsequent and final vulcanization treatment of these stocks, following the compression molding cycle, is preferably carried out at about 212° F. for a period of

TABLE IV

*Comparison between filled and unfilled elastomer vulcanizates*

| Run Number | 1 | 2 | 3 | 4 | 5 | 6 |
|---|---|---|---|---|---|---|
| Compound: | | | | | | |
| Elastomer | 100 | 100 | 100 | 100 | 100 | 100 |
| Zinc Oxide | 5 | 5 | 5 | 10 | 10 | 10 |
| MDI | 5 | 5 | 5 | | | |
| Tetraethylene Tetramine | 1 | 1 | 1 | | | |
| Benzoyl Peroxide | | | | 3 | 3 | 3 |
| Dibasic Lead Phosphite | | | | 10 | 10 | 10 |
| Precipitated Silica | | 20 | | | 20 | |
| Silicone Coated Precipitated Silica | | | 20 | | | 20 |
| Press Cure: | | | | | | |
| Time, hours | 1 | 1 | 1 | ½ | ½ | ½ |
| Temperature, °F | 260 | 260 | 260 | 230 | 230 | 230 |
| Oven Cure: | | | | | | |
| Time, hours | 16 | 16 | 16 | 16 | 16 | 16 |
| Temperature, °F | 212 | 212 | 212 | 300 | 300 | 300 |
| Physical Properties: | | | | | | |
| Stress at 300% E, p. s. i | 1,350 | 2,200 | 2,500 | 660 | 1,230 | 1,620 |
| Tensile Strength, p. s. i | 1,700 | 2,400 | 2,500 | 2,000 | 1,880 | 3,600 |
| Percent Elongation | 300 | 330 | 310 | 500 | 525 | 450 |
| Hardness, Shore A | 55 | 78 | 77 | 48 | 70 | 73 |
| Tear Strength, p. p. i | | 135 | 160 | 123 | | 204 | about 32 to 72 hours. Under these conditions, the initial tensile strengths of the isocyanate vulcanizates are low but tend to improve on aging. In general, the isocyanate cured stocks are stiffer, shorter, and less acid-resistant than peroxide cured stocks. The isocyanate stocks have been found to be more resistant to low hydrocarbon oils than the peroxide cured stocks. To improve the rate and extent of isocyanate vulcanization, 1 to 3 parts of various amines, such as trimene base, and tetraethylene pentamine, may be added to stocks which contain five parts of polyisocyanate. Although these stocks, like the isocyanate stocks, are stiffer and less acid-resistant, they are more resistant to hydrocarbon oils than peroxide cured vulcanizates.

As previously indicated, the compression molded vulcanizates of the elastomeric copolymers of the present invention possess high tensile strength and good extensibility. These properties, however, may be improved by the incorporation of various fillers. The effects of adding two such fillers, viz., precipitated silica and silicone coated silica, to peroxide and MDI-amine compounds are shown in Table IV.

In general, precipitated silicas increase the modulus and hardness without appreciably affecting the ultimate tensile strength or elongation of the peroxide cured stocks. The same fillers, e. g., precipitated silica, coated with a linear silicone polymer markedly increases both the tensile strength and tear strength of peroxide vulcanizates without changing elongation characteristics. It is believed that this high reinforcement results from cross-linking the silicone polymer to the fluorocarbon polymer.

The physical properties observed for a group of filled peroxide stocks are shown in Table V.

TABLE V

*Filled elastomer*

| Run Number | 1 | 2 | 3 | 4 | 5 |
|---|---|---|---|---|---|
| Elastomer | 100 | 100 | 100 | 100 | 100 |
| Zinc Oxide | 10 | 10 | 10 | 10 | 10 |
| Dibasic Lead Phosphite | 10 | 10 | 10 | 10 | 10 |
| Benzoyl Peroxide | 3 | 3 | 3 | 3 | 3 |
| Precipitated Silica | 20 | | | | |
| Silicone coated Precipitated Silica | | 20 | | | |
| Refined Silica | | | 20 | | |
| Zirconium Silicate | | | | 20 | |
| Carbon Black | | | | | 20 |
| Cure: Press—½ hr./230° F. Oven—16 hr./300° F. | | | | | |
| Stress at 300%, p. s. i | 1,230 | 1,620 | 1,200 | 800 | 290 |
| Tensile, p. s. i | 1,880 | 3,600 | 2,700 | 2,510 | 420 |
| Elongation, percent | 525 | 450 | 660 | 700 | 450 |
| Shore A Hardness | 70 | 73 | 75 | 60 | 69 |

In some instances it is desirable to have increased mechanical strength in the compression molded article. In such instances the desired improved mechanical strength can be obtained by reinforcement of the compression molded article, with a fabric inserted within, or as a backing on one side of, the molded part. The composition and weave of the fabric are important factors which will govern the mechanical quality of the composite structure. Accordingly, the elastomeric copolymer can, for example, be successfully molded into diaphragms having a fabric reinforcement.

The aforementioned technique for obtaining a reinforced diaphragm is carried out by first sheeting out a compounded stock on a two-roll mill to a thickness of approximately 10 percent over that of the final composite article (as previously indicated), to allow for a 10 percent set during the molding and curing treatment. The fabric is then inserted between two sheets of the elastomeric material and the composite piece is placed in the die cavity of the mold. The mold assembly is next inserted between the heated platens of the molding press, and the platens are then brought into contact with the mold. The temperature to be imposed upon the stock is adjusted before the application of the required pressure, so that the stock will flow readily at a relatively low pressure into the die cavity and into the interstices of the fabric. The composite piece is allowed to cure within the press, is then removed, and given an aftercure in an autoclave or air-oven. The required temperature-time cycle for the curing operation will, of course, depend upon the curing agents used, the degree of cure desired, and the thermal stability of the fabric.

An example of the aforementioned technique is illustrated by the fabrication of a rubber diaphragm for a one-inch Saunders-type valve:

Sheets of the elastomeric copolymer comprising trifluorochloroethylene and vinylidene fluoride, each present in an amount of approximately 50 mole percent, are prepared. Into these sheets are incorporated the desired curing agents. The unvulcanized sheet thus comprises 10 parts by weight of zinc oxide, 10 parts by weight of dibasic lead phosphite and 1.5 parts by weight benzoyl peroxide per 100 parts of elastomeric material. Between the two sheets of the above-mentioned uncured elastomeric copolymer is placed the fabric reinforcement. This fabric is essentially cotton duck, of a 23/23 count; 4 ply thread, and having a weight of 13.7 oz./yd.² The sandwich-assembly, which is now placed within the die cavity of the mold, comprises a lower elastomeric sheet of $2.125 \times 2.125 \times .125$ inches; the fabric reinforcement superimposed upon this lower sheet has the dimensions of $2.5 \times 2.75 \times .030$ inches; the upper elastomeric sheet which is now superimposed upon the aforementioned fabric material, is of the dimensions $1.75 \times 1.75 \times 2.75$ inches. The total weight of the entire sandwich-assembly is approximately 60 grams.

After the sandwich-assembly is placed within the die cavity, the platens are brought up to a temperature of approximately 230° F. and then lowered upon the stock, with a pressure imposed thereon of approximately 200 pounds per square inch for two minutes. The mold is then slowly closed and the pressure is brought up to approximately 400 pounds per square inch for one minute. Pressure is raised to approximately 1,000 pounds per square inch and is held for thirty minutes. The mold is then opened and the molded piece is removed. This piece is then placed in an oven which is held at 250° F. for about 16 hours. It will be apparent, of course, that other elastomeric compositions of the present invention and other fabrics, may also be employed.

It should also be noted that in some instances the surface of the die cavity may be coated with release agents, in order to facilitate the ease with which the finished molded article may be removed from the die. For this purpose such agents may be employed as sodium alkyl sulfates. These release agents are particularly desirable for organic peroxide and amine-type cured stocks. Other types of release agents are the silicone emulsions, which are preferred for obtaining polyisocyanate cured stocks. Still other release agents that may be incorporated for the aforementioned purpose are alkyl aryl sulfonates and polyethylene glycols.

By following the procedures set forth above, it has been found possible to compression mold the elastomeric copolymeric materials of the present invention into a wide variety of shapes and sizes to produce numerous articles of wide utility, which include sheets, O-rings, unsupported and reinforced valve-diaphragms, grommets for electrical connectors, gaskets, shaft-seals, button seals, and various other articles.

Since certain changes may be made in carrying out the above method, and in the apparatus employed, without departing from the scope of the invention, it is intended that all matter contained in the above description is to be interpreted as illustrative and not necessarily in a limiting sense.

I claim:

1. A method for forming articles from a material comprising an elastomeric copolymer of trifluorochloroethylene and vinylidene fluoride, said copolymer containing between about 20 and about 69 mole percent trifluorochloroethylene and correspondingly between about 80 and about 31 mole percent vinylidene fluoride, said elastomeric copolymer undergoing a transition from an elastomeric state to a non-elastic powdery state at about 170–190° F., said process comprising placing said material in a die, maintaining said die at a temperature range above the transition temperature and below the temperature of substantial decomposition of said copolymer under compacting pressure between about 200 and about 3,000 pounds per square inch for a time sufficient to permit said material to assume the internal contour of said die and attain the size and shape of the desired article, and thereafter removing said formed article from said die.

2. A method for forming articles from a material comprising an elastomeric copolymer of trifluorochloroethylene and vinylidene fluoride, said copolymer containing between about 20 and about 69 mole percent trifluorochloroethylene and correspondingly between about 80 and about 31 mole percent vinylidene fluoride, said elastomeric copolymer undergoing a transition from an elastomeric state to a non-elastic powdery state at about 170–190° F., said process comprising placing said material in a die, maintaining said die at a temperature between the transition temperature of said copolymer and about 300° F. under compacting pressure between about 200 and 3,000 pounds per square inch for a time sufficient to permit said material to assume the internal contour of said die and attain the size and shape of the desired article, and thereafter removing said formed article from said die.

3. A method for forming articles from a material comprising an elastomeric copolymer of trifluorochloroethylene and vinylidene fluoride, said copolymer containing between about 20 and about 69 mole percent trifluorochloroethylene and correspondingly between about 80 and about 31 mole percent vinylidene fluoride, said elastomeric copolymer undergoing a transition from an elastomeric state to a non-elastic powdery state at about 170–190° F., said process comprising placing said material in a die, maintaining said die at a temperature between about 225° F. and about 300° F. under compacting pressure between about 200 and about 3,000 pounds per square inch for a time sufficient to permit said material to assume the internal contour of said die and attain the size and shape of the desired article, and thereafter removing said formed article from said die.

4. A method for forming articles from a material comprising an elastomeric copolymer of trifluorochloroethylene and vinylidene fluoride, said copolymer containing between about 20 and about 69 mole percent trifluorochloroethylene and correspondingly between about 80 and about 31 mole percent vinylidene fluoride, said elastomeric copolymer undergoing a transition from an elastomeric state to a non-elastic powdery state at about 170–190° F., said process comprising placing said material in a die, maintaining said die at a temperature range above the transition temperature and below the temperature of substantial decomposition of said copolymer under compacting pressure between about 1,500 and about 2,500 pounds per square inch for a time sufficient to permit said material to assume the internal contour of said die and attain the size and shape of the desired article, and thereafter removing said formed article from said die.

5. A method for forming articles from a material comprising an elastomeric copolymer of trifluorochloroethylene and vinylidene fluoride, said copolymer containing between about 20 and about 69 mole percent trifluorochloroethylene and correspondingly between about 80 and about 31 mole percent vinylidene fluoride, said elastomeric copolymer undergoing a transition from an elastomeric state to a non-elastic powdery state at about 170–190° F., said process comprising placing said material in a die, maintaining said die at a temperature between the transition temperature of said copolymer and about 300° F. under compacting pressure between about 1,500 and about 2,500 pounds per square inch for a time sufficient to permit said material to assume the internal contour of said die and attain the size and shape of the desired article, and thereafter removing said formed article from said die.

6. A method for forming articles from a material comprising an elastomeric copolymer of trifluorochloroethylene and vinylidene fluoride, said copolymer containing between about 20 and about 69 mole percent trifluorochloroethylene and correspondingly between about 80 and about 31 mole percent vinylidene fluoride, said elastomeric copolymer undergoing a transition from an elastomeric state to a non-elastic powdery state at about 170–190° F., said process comprising placing said material in a die, maintaining said die at a temperature between about 225° F. and about 300° F. under compacting pressure between about 1,500 and about 2,500 pounds per square inch for a time sufficient to permit said material to assume the internal contour of said die and attain the size and shape of the desired article, and thereafter removing said formed article from said die.

7. The method of claim 1 wherein said copolymer contains a vulcanizing agent.

References Cited in the file of this patent

UNITED STATES PATENTS

| | | |
|---|---|---|
| 2,617,150 | Rubin | Nov. 11, 1952 |
| 2,646,595 | Leistensnider | July 28, 1953 |
| 2,689,241 | Dittman et al. | Sept. 15, 1954 |
| 2,774,109 | Kaufman | Dec. 18, 1956 |

UNITED STATES PATENT OFFICE
CERTIFICATE OF CORRECTION

Patent No. 2,854,699                                       October 7, 1958

Lester E. Robb

It is hereby certified that error appears in the printed specification of the above numbered patent requiring correction and that the said Letters Patent should read as corrected below.

Column 11, line 29, for "3,000 pounds" read -- about 3,000 pounds --.

Signed and sealed this 30th day of June 1959.

(SEAL)
Attest:

KARL H. AXLINE                                     ROBERT C. WATSON
Attesting Officer                                 Commissioner of Patents